United States Patent Office 2,765,929
Patented Oct. 9, 1956

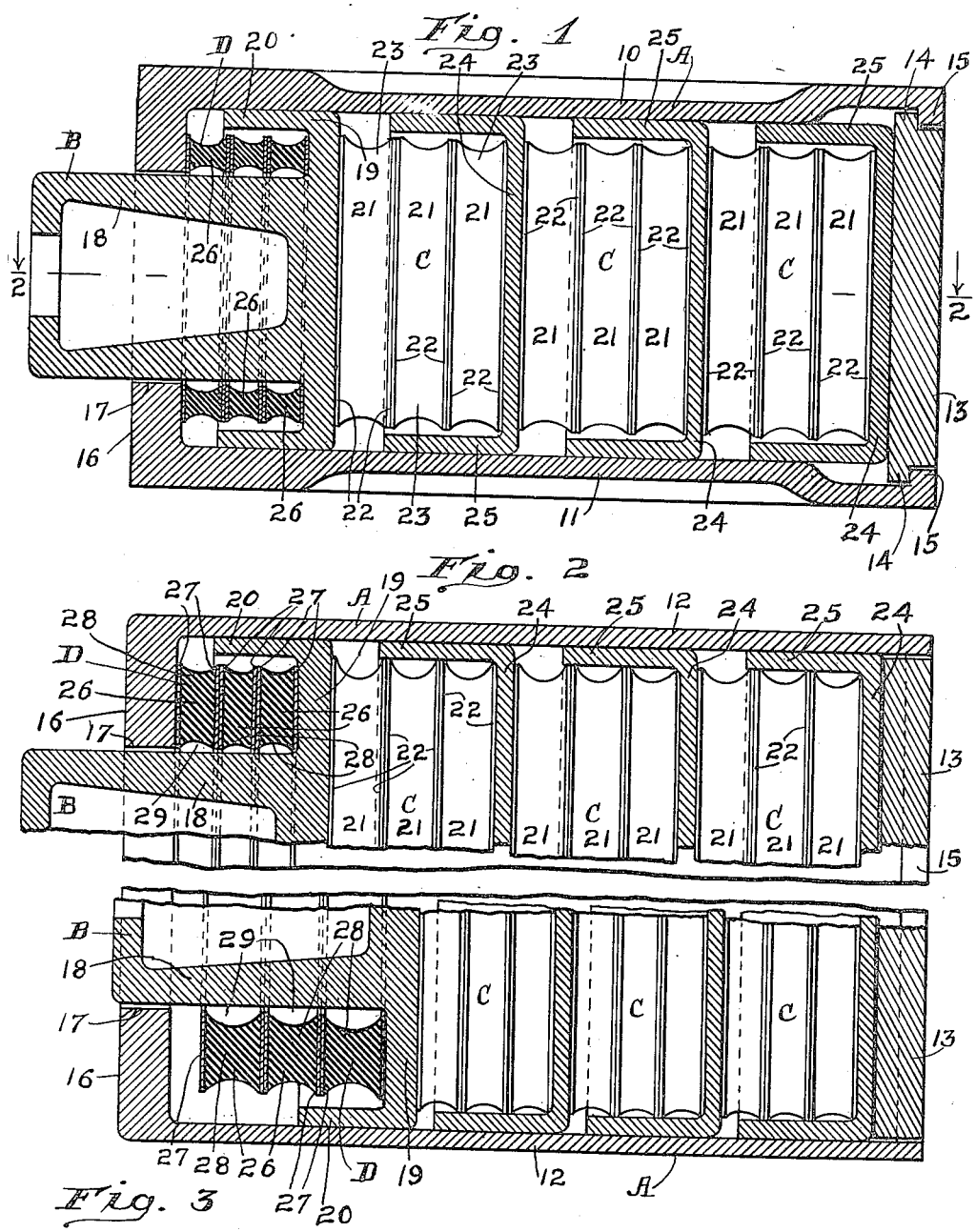

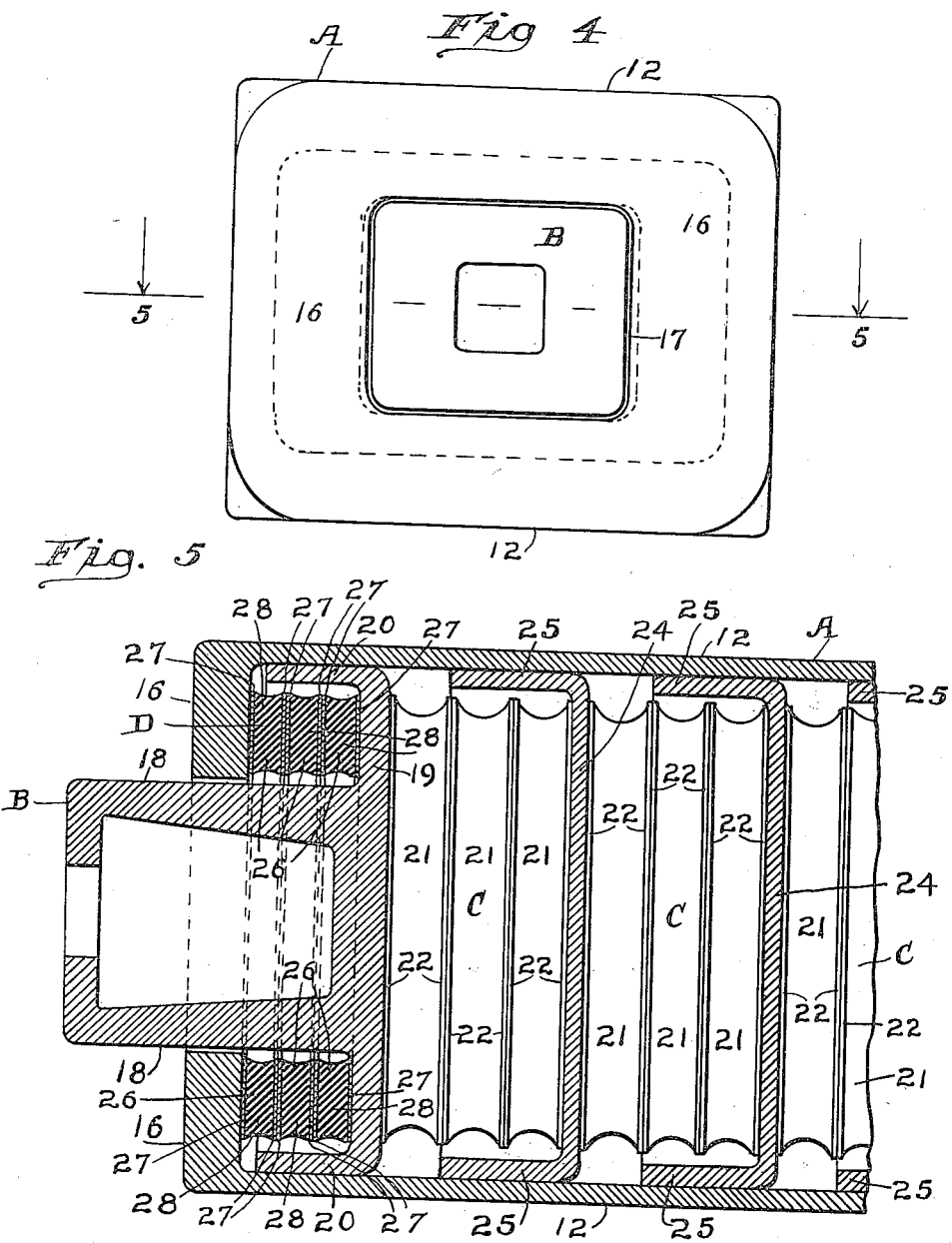

2,765,929
RUBBER SHOCK ABSORBING MECHANISMS

Harry W. Mulcahy, Chicago, Ill., assignor to W. H. Miner, Inc., Chicago, Ill., a corporation of Delaware Application October 5, 1953, Serial No. 384,028

3 Claims. (Cl. 213—40)

This invention relates to improvements in rubber shock absorbing mechanisms, especially adapted for railway draft riggings.

One object of the invention is to provide a shock absorbing mechanism comprising a rubber cushioning means which is compressed to absorb shocks, and means for dampening the recoil of the rubber cushioning means, to prevent jars which would otherwise result in recoil action.

Another object of the invention is to provide a rubber shock absorbing mechanism comprising a rubber cushioning means of high shock absorbing capacity which is compressed in absorbing shocks, and rubber cushioning means which is of somewhat lower capacity for dampening the recoil action of the high capacity rubber cushioning means, wherein both cushioning means are under initial compression to obliterate slack during all stages of operation of the mechanism.

A further object of the invention is to provide a rubber shock absorbing mechanism, comprising a casing, a rubber cushioning means of high capacity, which is compressed in absorbing the shocks, a rubber cushioning means which is of lower capacity for dampening the recoil action of the high capacity cushioning means disposed within said casing, and a pressure transmitting, reciprocating follower within the casing interposed between said high capacity and low capacity cushioning means, the high capacity rubber cushioning means being interposed between the follower and one end of the casing, and the low capacity rubber cushioning means being interposed between said follower and the opposite end of the casing.

A more specific object of the invention is to provide a rubber shock absorbing mechanism, comprising a casing having a transverse wall closing one end, and a second transverse wall at the opposite end which has an opening therethrough, a follower within the casing having a pressure transmitting plunger extending therefrom and projecting through the opening of said last named wall, a rubber shock absorbing means of high capacity interposed between said follower and first named wall and compressed against said wall by said follower to cushion shocks, and a rubber cushioning means of lesser capacity interposed between said follower and said second named wall of the casing, wherein both the high and low capacity cushioning means are under initial compression.

Other objects of the invention will more clearly appear from the description and claims hereinafter following.

In the accompanying drawings forming a part of this specification,

Figure 1 is a longitudinal vertical sectional view of my improved rubber shock absorbing mechanism, showing certain of the rubber elements in plan.

Figure 2 is a horizontal, longitudinal sectional view, corresponding substantially to the line 2—2 of Figure 1, with one side thereof broken away.

Figure 3 is a horizontal sectional view, also corresponding to the line 2—2 of Figure 1, broken away at one side, the side shown being the opposite to that shown in Figure 2, Figure 3 showing the mechanism compressed.

Figure 4 is a front elevational view of the mechanism shown in Figure 1.

Figure 5 is a horizontal, longitudinal sectional view, corresponding substantially to the line 5—5 of Figure 4 and showing the mechanism in recoil action, illustrating certain of the rubber elements in elevation.

As shown in the drawings, my improved rubber shock absorbing mechanism comprises a casing A, a pressure transmitting member B, a shock absorbing rubber cushioning element C, and a rubber dampening element D.

The casing A is in the form of a rectangular, boxlike member having longitudinally extending, vertically spaced, top and bottom walls 10 and 11, and longitudinally extending, laterally spaced, vertical side walls 12—12. The rear end of the casing is closed by a removable wall 13, having top and bottom flanges 14—14 engaged in back of inturned ribs or flanges 15—15 on the top and bottom walls 10 and 11. At the front end, the casing A is provided with a transverse wall 16, having a central opening 17, extending therethrough. As shown, the opening 17 is of rectangular form.

The pressure transmitting member B comprises a hollow plunger or post 18, having a transversely disposed follower 19 at the rear end thereof. The follower 19 is in the form of a rectangular plate, provided with a forwardly projecting, peripheral flange 20, which is continuous around said plate.

The rubber cushioning element C is disposed within the casing A, between the follower 19 and the rear wall 13 of the casing. The element C includes a plurality of rubber cushioning units 21—21, each composed of a pair of flat metal plates 22—22 and a rubber pad 23 interposed between and bonded to the plates. As illustrated, the rubber cushioning units 21 are arranged in groups of three units each, the groups being separated by spacing followers 24—24—24. In the present instance, the rubber cushioning element C comprises three such groups and three spacing followers 24, one of such followers being interposed between the rearmost group of units and the rear wall 13 of the casing, a second follower 24 being interposed between said rearmost group of units and the next group forwardly thereof, and the third follower 24 being interposed between the last named group and the group forwardly thereof. Each of the followers 24 has a forwardly extending, peripheral flange 25, which overhangs the group of units in front of said follower.

The rubber dampening element D is disposed within the casing A between the follower 19 and the front wall 16 of the casing. The element D comprises a plurality of rubber cushioning units 26—26—26, preferably three, each composed of a pair of metal plates 27—27 and an interposed rubber pad 28 bonded to said plates. The plates 27—27 and the pad 28 of each unit are centrally cut out to provide square openings 29—29—29 therethrough, adapted to loosely accommodate the plunger or post 18 of the member B.

In the assembled condition of the mechanism, the rubber elements C and D are both under initial compression and in balance, and in operation of the mechanism the pressure transmitting member B is forced inwardly and rearwardly of the casing with the usual front follower, not shown, of a railway draft rigging, which follower engages the outer end of the post 18 of the member B. As the member B moves inwardly, the cushioning element C is compressed to absorb the shock. During this action, the parts are moved toward the position shown in Figure 3, which illustrates the approximate maximum compression of the mechanism, the rubber dampening element D being relieved from pressure and expanding as the follower 19 moves rearwardly.

Upon reduction of the actuating pressure, the cushioning element C expands, forcing the follower 19 of the member B outwardly and compressing the rubber element D against the front wall 16 of the casing A, as illustrated in Figure 5. During this expansion of the cushioning element C, the rubber element D acts to dampen the recoil and is compressed to an extent which may exceed, as shown in Figure 5, the initial compression thereof as shown in Figures 1 and 2. After dampening the recoil action of the element C, the parts of the mechanism return to the positions shown in Figures 1 and 2, with the rubber elements C and D in balance.

I claim:

1. A shock absorbing mechanism comprising: the combination with a casing having a perforated front wall and a solid back wall; of a pressure transmitting member including a platelike follower shaped to slidably fit in the casing, a plunger extending forwardly from said follower through the perforated front wall of the casing and therebeyond, and a flange on the follower engaging the casing, extending forwardly from the follower and spaced outwardly from the plunger; a first resilient column disposed between said follower and rear wall; and a second and smaller resilient column disposed between said follower and front wall and in the space between said plunger and flange.

2. A shock absorbing mechanism as specified in claim 1 in which the first and second resilient columns comprise a plurality of units, each consisting of a rubber pad bonded between a pair of metal plates and in which the pads are maintained under initial compression.

3. A shock absorbing mechanism as specified in claim 1 in which the flange may strike the front wall of the casing to limit the expansion of the first resilient column and the compression of the second resilient column.

References Cited in the file of this patent
UNITED STATES PATENTS

| | | |
|---|---|---|
| 1,544,032 | Potez | June 30, 1925 |
| 2,486,741 | Gabriel | Nov. 1, 1949 |